(12) United States Patent
Ferrer Vidal

(10) Patent No.: US 6,358,340 B2
(45) Date of Patent: *Mar. 19, 2002

(54) METHOD AND APPARATUS FOR THE PRODUCTION OF HONEYCOMBS FOR BEEKEEPING

(75) Inventor: Carlos Ferrer Vidal, Barcelona (ES)

(73) Assignee: Breat, S.L., Barcelona (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,446

(22) Filed: Jun. 25, 1998

(30) Foreign Application Priority Data

Jul. 15, 1997 (ES) ............................................... 9701564
Jun. 4, 1998 (ES) ............................................... 9801156

(51) Int. Cl.[7] .......................... B32B 31/20; A01K 47/04
(52) U.S. Cl. ..................... 156/61; 156/245; 156/308.2; 264/214; 449/42
(58) Field of Search ............................ 449/17, 92, 44, 449/58, 60; 156/61, 152, 197, 245, 264, 292, 309.6, 308.2; 264/313, 213, 214, 216, 177.12, 212; 425/115, 116, 224, 262, 371

(56) References Cited

U.S. PATENT DOCUMENTS

| | | | | |
|---|---|---|---|---|
| 2,561,147 A | | 7/1951 | Smith ............................ 6/11 |
| 3,284,248 A | * | 11/1966 | Rumberger ................. 428/333 |
| 3,582,036 A | * | 6/1971 | Condis ........................ 249/152 |
| 4,077,110 A | * | 3/1978 | Reiher .......................... 29/458 |
| 4,148,851 A | * | 4/1979 | Tani et al. .................... 264/23 |
| 4,357,269 A | * | 11/1982 | Landi et al. ................. 523/206 |
| 4,755,334 A | * | 7/1988 | Grimm et al. ............. 264/40.7 |
| 4,971,746 A | * | 11/1990 | Ferrer ......................... 264/279 |
| 5,567,145 A | * | 10/1996 | White ......................... 431/288 |

FOREIGN PATENT DOCUMENTS

| | | |
|---|---|---|
| FR | 2448290 A | 9/1980 |
| FR | 2560746 A | 9/1985 |
| WO | 9006219 | 6/1990 |

* cited by examiner

Primary Examiner—Jeff H. Aftergut
Assistant Examiner—Gladys Piazza
(74) Attorney, Agent, or Firm—Darby & Darby

(57) ABSTRACT

The method comprises a first step of applying liquid wax to a mold formed by a plurality of projections conjugate with the cells of the honeycomb in a manner such that the filling of the spaces of the mold with molten wax is complemented by the formation of an upper plate interconnecting the various cells, then proceeding with the molding of the half honeycomb and subsequent cooling to enable the half honeycomb to be removed from the mold. The apparatus has two parallel, endless belts separated by a space slightly larger than the height of a half honeycomb and driven in a manner such that the adjacent passes have the same speed and direction of movement, a mold constituted by a plurality of rows of silicone projections of a shape conjugate with the cells being fitted on one of the belts.

8 Claims, 6 Drawing Sheets

METHOD AND APPARATUS FOR THE PRODUCTION OF HONEYCOMBS FOR BEEKEEPING

DESCRIPTION

The present invention relates to a method and to the corresponding apparatus for the preparation of honeycombs for beekeeping, contributing considerable characteristics of novelty and inventive activity to the currently known method.

The preparation of wax honeycombs so that bees can deposit honey therein has become widespread in recent years as a means of avoiding the need for the bees not only to perform the work of filling the honeycomb with the honey which they produce, but also to prepare their own honeycomb beforehand, which represents a much longer production time and hence a lower yield from the hive of bees.

Amongst currently known methods for solving the said problem is that which comprises the forming of the honeycomb by means of groups of cores of a shape conjugate with the holes on both faces of the honeycomb in suitable apparatus which supplies the wax to the molding region and subsequently enables the honeycomb to be removed and cooled. These honeycombs have to be incorporated in a receiving frame which considerably increases costs and reduces adaptability to hives of different types.

The method and apparatus of the present invention are intended precisely to achieve more economical preparation of the honeycombs, dispensing with the supporting frames or casing and permitting easy adaptation to hives of different types.

In order to achieve its objectives, the present invention provides the continuous molding of the honeycombs for beekeeping in the form of half honeycombs produced between two conveyor belts arranged parallel to one another with a separation slightly greater than the thickness of the honeycomb, as will be explained. In the method of the present invention, as a panel or mold carrying the plurality of cores for forming the cells of a half honeycomb moves on one of the conveyor belts, at the beginning of the region in which the two belts coincide, the spaces situated between the cores are filled with molten wax, provided by external means, the wax adapting itself to all of the spaces between the cores and, in addition, forming a thin plate which connects the spaces between the cores and which will subsequently constitute the plate connecting the various cells of a half honeycomb. After the spaces between cores have been filled, the molded half honeycomb which is in contact, by means of the cells, with the panel carrying the cores and, by means of the base, with the other belt which passes parallel to that carrying the plate of the cores, is cooled. At the end of its travel between the two belts, the half honeycomb will already have solidified sufficiently to be able to be separated from the core-carrying panel which has resilience characteristics.

To improve the filling of the spaces between the cores of resilient material which are intended to form the cells of a honeycomb, a slight transverse separation of the said cores is brought about by mechanical action, creating a larger opening thereof and thus enabling the quantity of wax contained between every two cores to be increased, by virtue of the said partial opening, in comparison with that strictly necessary to form the completed honeycomb cells so that the surplus wax will be projected towards the belt which passes opposite that carrying the cores, enabling the base plate connecting the various cells to be formed so as to correspond to a half honeycomb.

Moreover, to assist the separation of the half honeycomb from the upper conveyor belt once it has been molded and partially cooled, the said belt is heated locally in order to soften the wax of the half honeycomb corresponding to the region of contact with the belt, which can easily be separated. To achieve an additional improvement in the said separation, the present invention provides for the arrangement of a transverse wire which, upon acting on the softened or molten laminar region, brings about a mechanical action for separating the half honeycomb produced.

According to a variant of the present invention, the intermittent operation of the apparatus is converted into continuous operation by virtue of the conversion of the belt carrying the molding cells into a continuous belt unit having projections for forming the half honeycombs over its entire surface, without a break throughout its length, so that the wax is supplied continuously, the lower belt continuously transporting a layer of wax coupled with the moulding projections which, upon acting in combination with the upper belt, permit the production of an element of indeterminate length and with a structure corresponding to that of a half honeycomb, but of indefinite length. At the output of the unit with the two belts, there is a cutting system which enables half honeycombs of the desired length to be produced. The useful length of the half honeycomb may be variable by variation of the cutting length.

For a better understanding, some drawings of the method and apparatus of the present invention are appended by way of non-limiting example.

Figure 1:
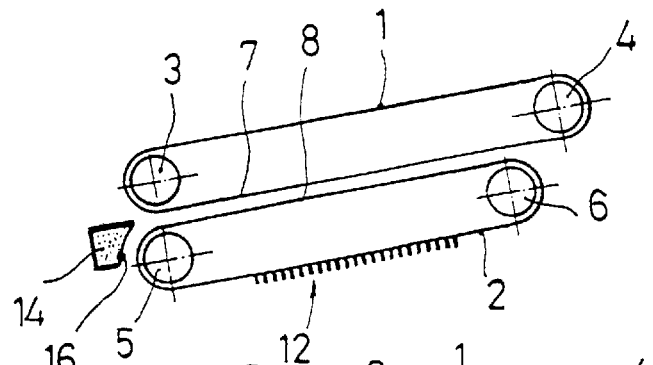
FIGS. 1 to 5 show various steps of the method; these drawings show two endless, parallel belts, one carrying the resilient mold constituted by a plurality of cores for forming the cells of the half honeycomb, the drawings then showing the initial step of the filling of the spaces with molten wax, the step of molding and cooling the half honeycomb produced, and the final step of separation thereof.
Figure 2:
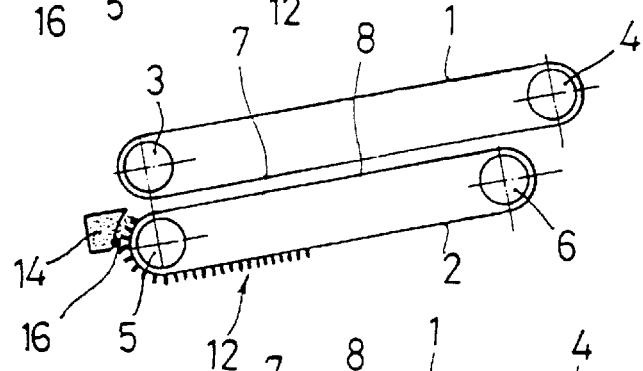
Figure 3:
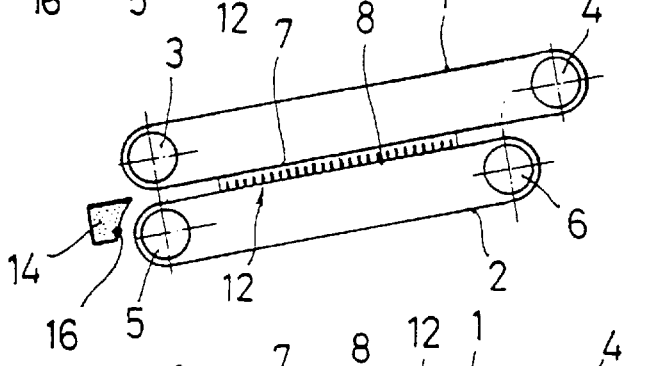
Figure 4:
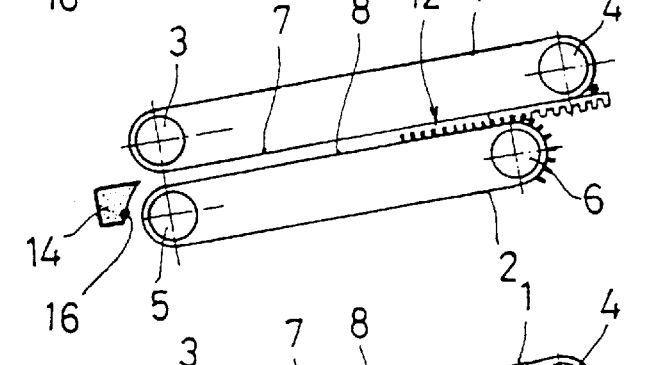
Figure 5:
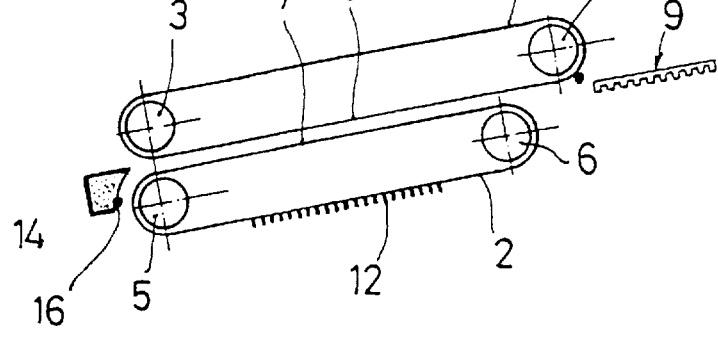

According to the drawings, the half honeycombs are manufactured by two endless conveyor belts 1 and 2 mounted, respectively, on rollers 3, 4 and 5, 6, which are moved in a manner such that the inner runs 7 and 8 of the said belts move in the same direction and at the same speed. The space between the said runs 7 and 8 is slightly larger than the half honeycomb to be produced, which is indicated 9 in FIGS. 5 and 8. The said half honeycomb comprises a plurality of projections in the form of resilient cores 10 and a joining region or back plate 11 which connects them.

Figure 6:
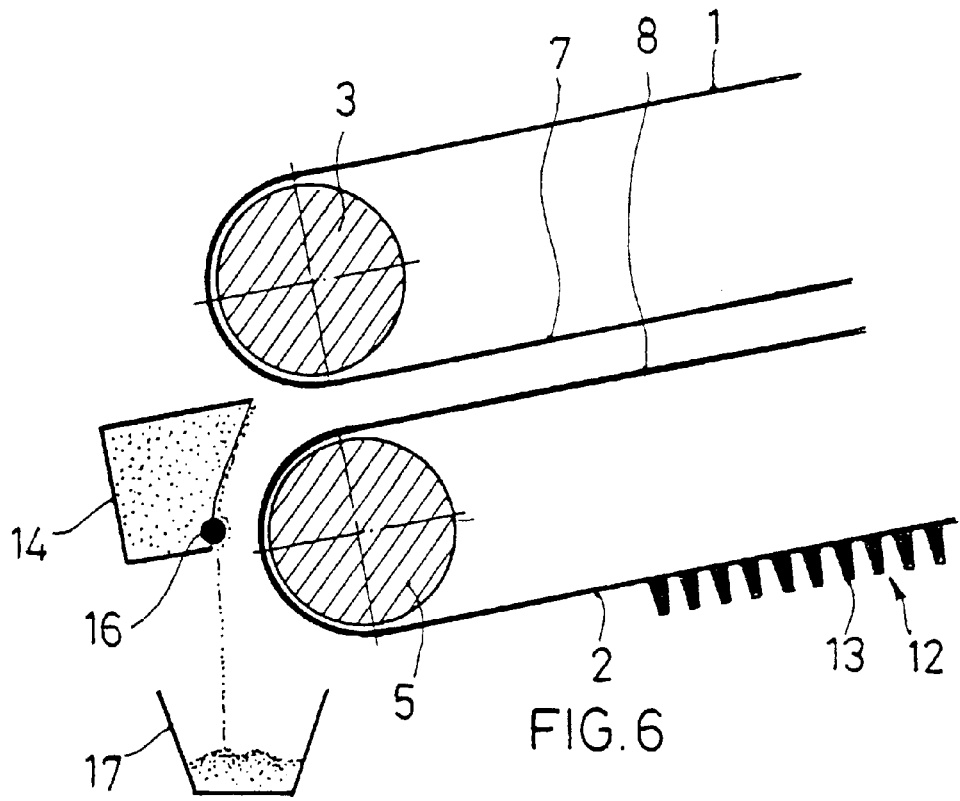
FIGS. 6 and 7 show details of the application of the hot wax to the resilient core.
Figure 7:
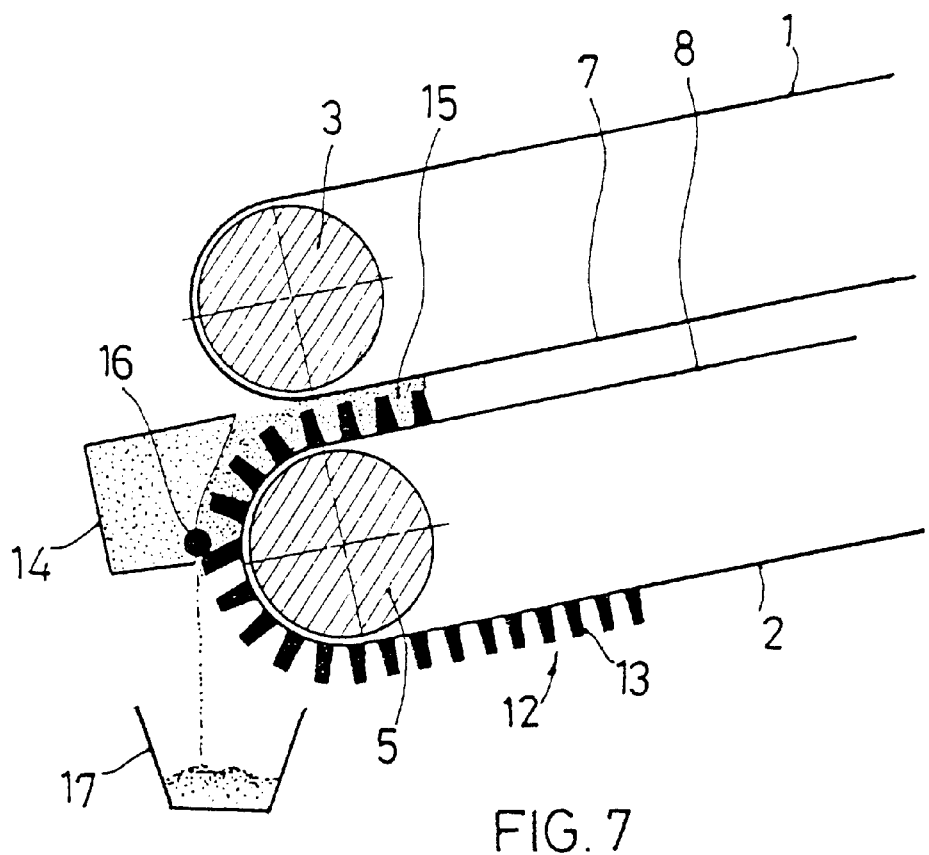
Figure 8:
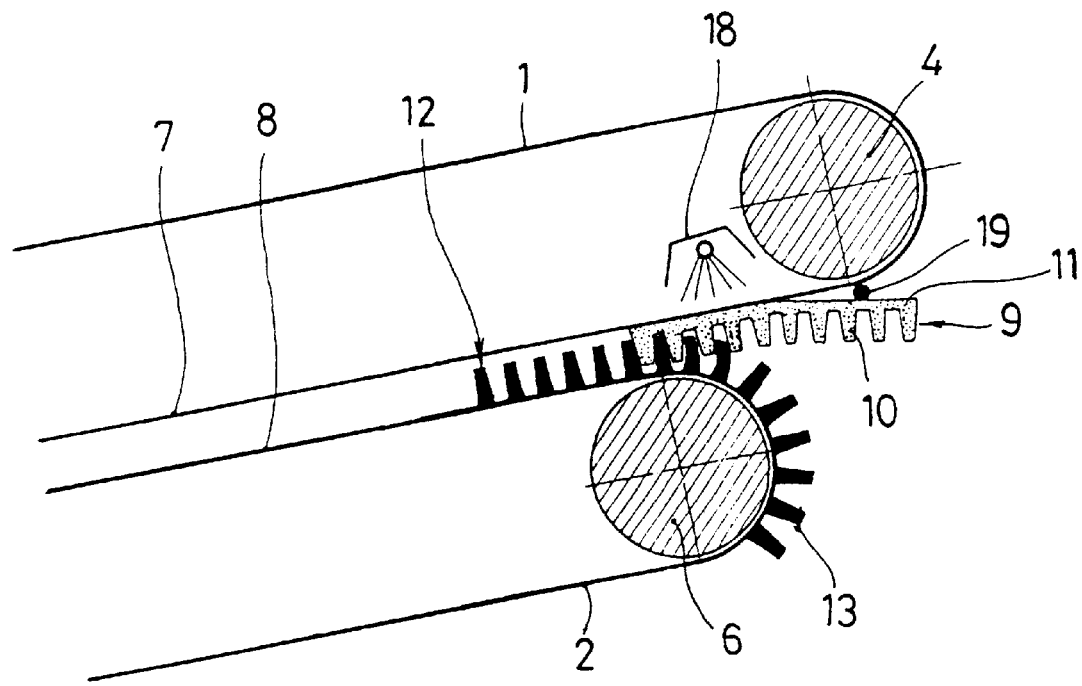
FIG. 8 shows the step of the removal of the half honeycomb produced from the resilient core.

Preferably, the endless belts 1 and 2 are arranged at a small angle to the horizontal and the lower belt has a region or mold 12 provided with a plurality of rows of resilient cores 13, FIGS. 6 to 8, which are intended to form the cells of the half honeycombs to be produced. As the mold moves in front of a wax-supply vessel 14, the spaces between the cores 13 are filled, as can be seen in greater detail in FIG. 7, in which it can be seen that the spaces between the cores 13 are filled with masses of wax 15 which also form the rear joining region or plate 11.

In order to improve the filling of the spaces between the cores 13, a mechanism is provided for opening out the spaces at the moment when they are filled; this mechanism may be a simple roller 16 which establishes contact with a region in the vicinity of the tip or end of the cores 13, enlarging the intermediate spaces and allowing a quantity of wax greater than the stable volume 15 shown to enter between every two cores; owing to the resilient action of the cores, this enables the surplus volume of wax to be expelled outwardly relative to the cores, enabling the connecting region or plate 11 to be formed correctly. A lower container 17 is intended to receive the surplus wax from the filling operation.

After the spaces between the cores have been filled, the movement of th endless belts arranged close together as shown in the drawings, permits the correct formation of the half honeycomb 9 which is the objective of the method. During its passage between the two endless belts, cooling of the half honeycomb takes place and leads to its solidification.

To improve the removal from the upper belt 1 of the half honeycomb produced when the end of the travel is reached, as can be seen in FIG. 8, the present invention provides for the arrangement of a heat source 18 situated in the vicinity of the output of the half honeycomb produced, preferably on the inner side of the conveyor belt 1, the heat source being intended to bring about local softening or melting of the rear portion of the plate 11 of the half honeycomb to enable it to be detached more easily. To improve the said detachment, the present invention provides for the arrangement of a wire or thin bar 19, substantially touching the conveyor belt 1, facilitating the separation of the half honeycomb 9 from the upper belt 1.

Figure 9:
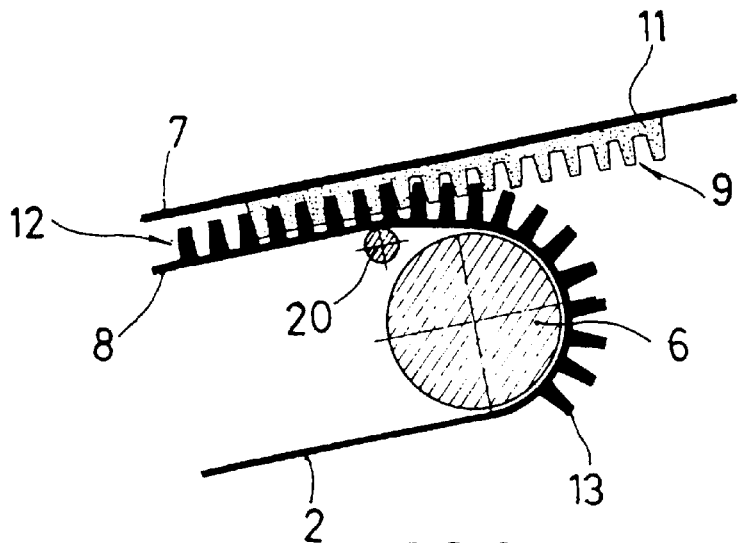
FIG. 9 shows a version with an auxiliary roller for detaching the half honeycombs formed.
Figure 10:
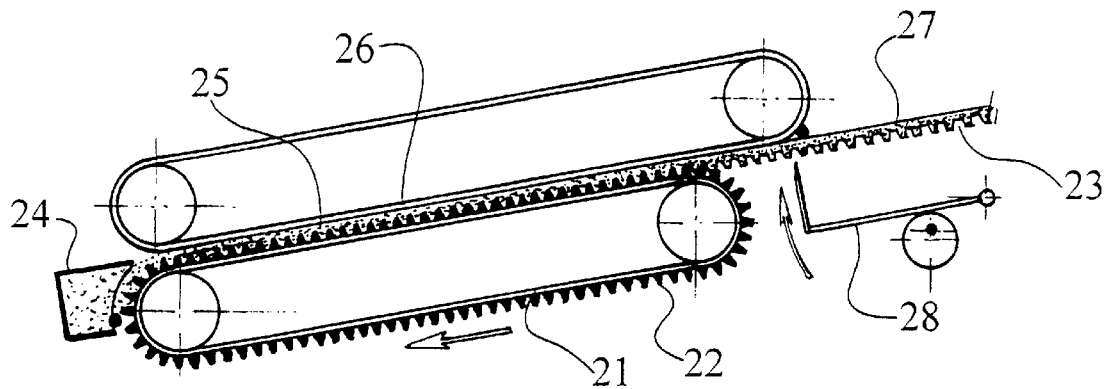
FIGS. 10 and 11 show respective schematic views of the unit with the two belts and of the cutting device at the output thereof, according to a variant of the invention.
Figure 11:
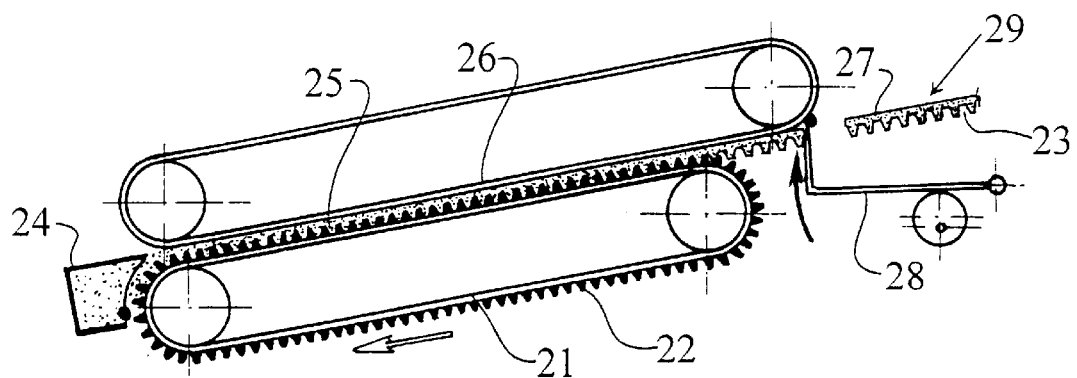
Figure 12:
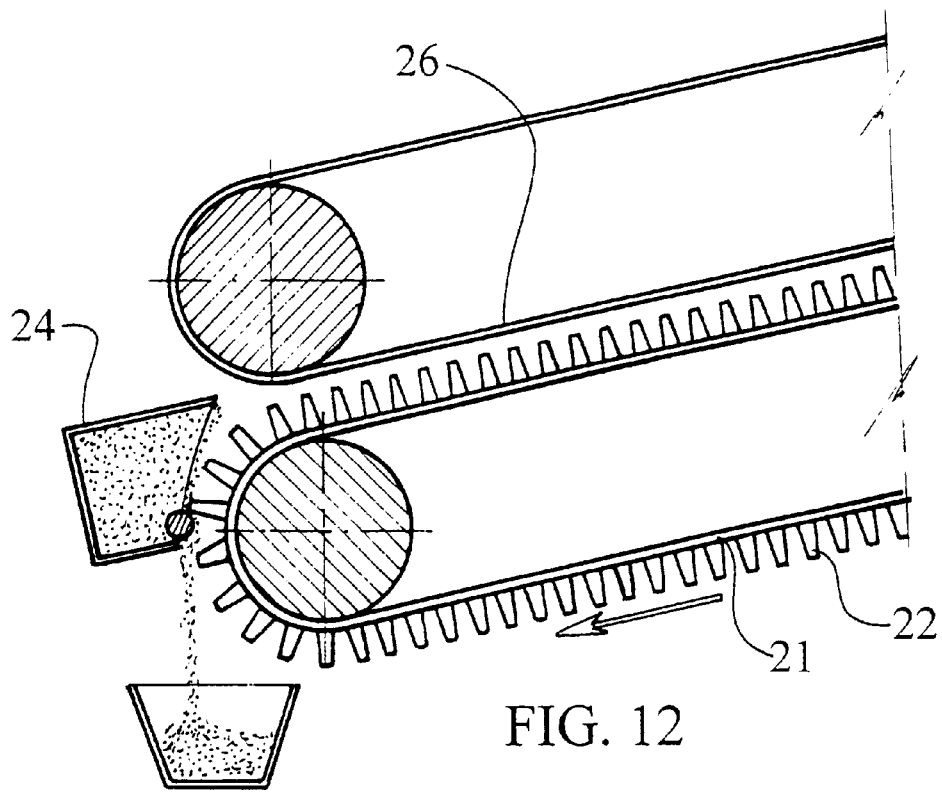
FIGS. 12 and 13 show respective details of the wax-supply region of the variant indicated.
Figure 13:
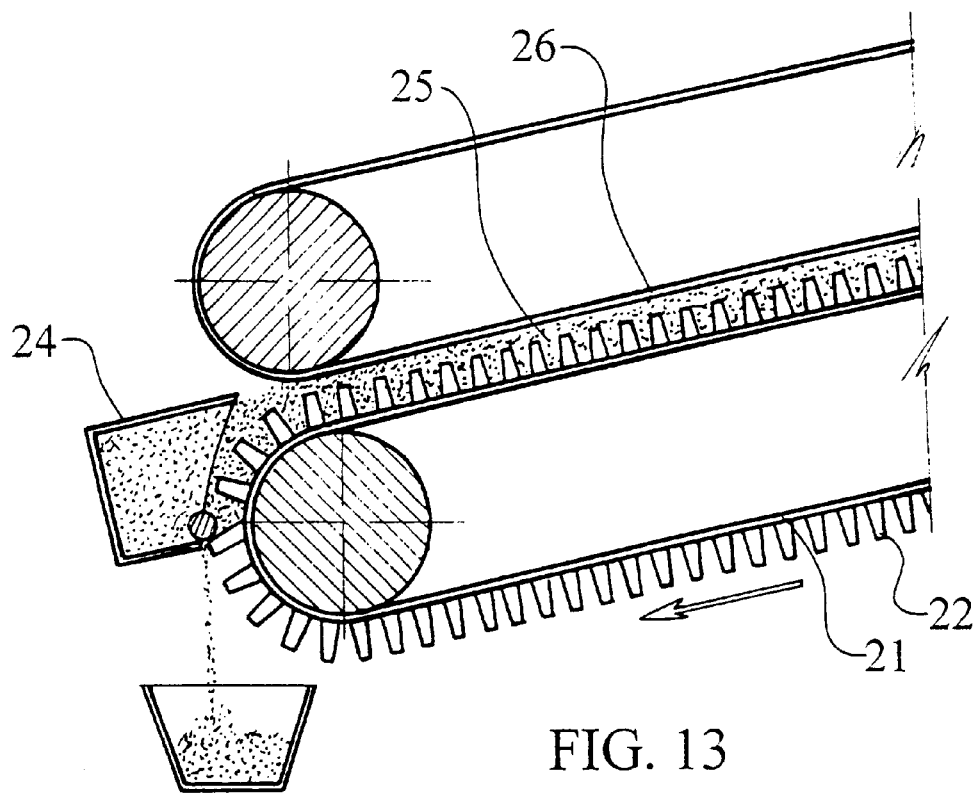
Figure 14:
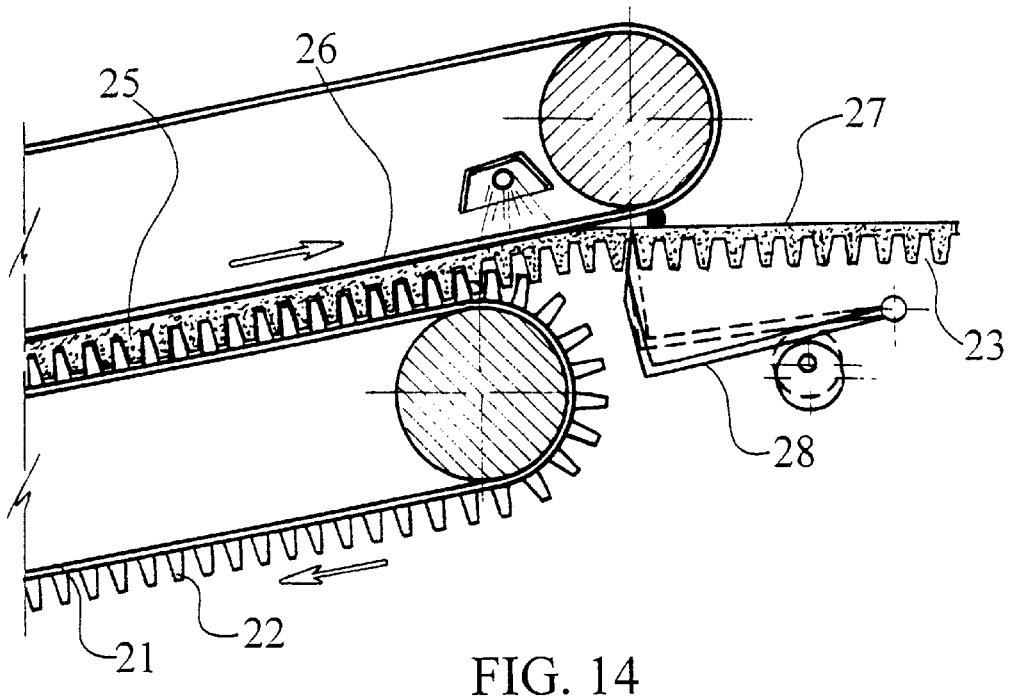
FIGS. 14 and 15 show, in section, respective details of the cut portion of the element produced at the output of the process in the same variant as FIGS. 12 to 15.
Figure 15:
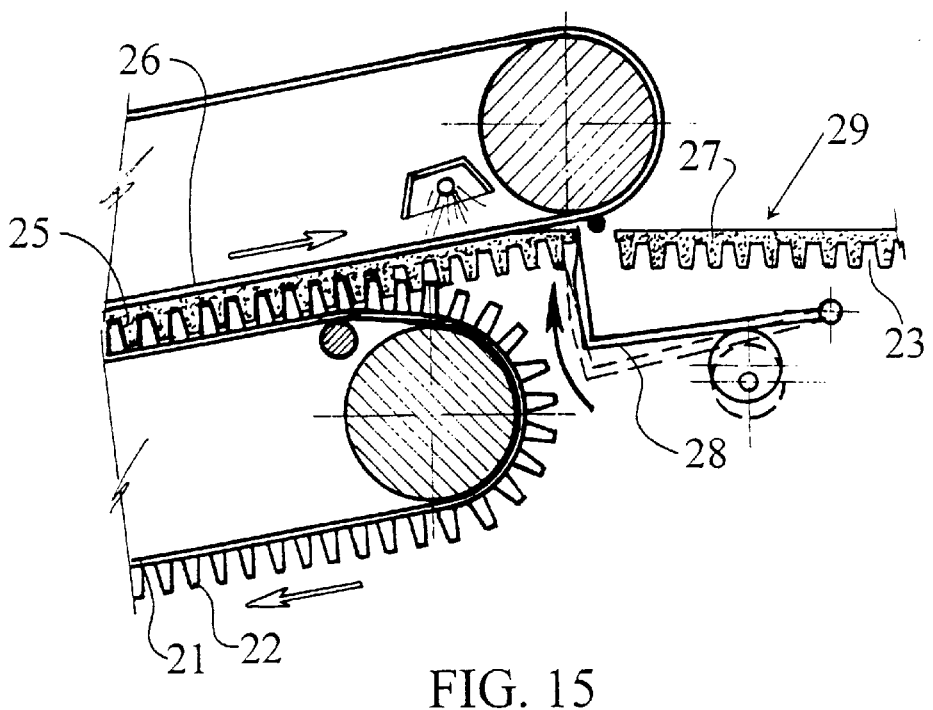

For half honeycombs with very thin walls, the arrangement shown in FIG. 9 may be advantageous; this drawing shows an auxiliary roller 20 which, together with the end roller 6 of the lower belt 2, enables a greater smoothness to be achieved in the separation of the half honeycomb from the upper belt.

Preferably, the endless belts 1 and 2 are steel-based belts and the molds or groups of cores 13 are silicone-based in order to give them sufficient resilience and favorable mold-release characteristics.

The method provides for the addition of a certain quantity of water to the molten wax to ensure better adhesion of the half honeycomb to the upper belt, means being provided for replacing the water which is used up during the operation of the machine.

As will be understood, the method and apparatus of the present invention permits the production of half honeycombs, that is, elements such as that indicated 9 in FIG. 8 such that, in order to produce the complete honeycomb, it will be necessary to use two of the said half honeycombs, joined by their bases, the various cores extending in opposite directions.

The present invention permits the production of half honeycombs the dimensions of which are variable according to the mold used. In this connection, it should be borne in mind that, for simplicity, the drawings do not show the half honeycomb 9 with the same dimensions as the mold or core region 12; however, this is only a convention of representation since, depending on the filling of the mold, the half honeycomb produced may have dimensions variable up to overall dimensions corresponding to the whole mold.

The variant of FIGS. 10 to 15 provides for the lower belt 21 to be formed in a manner such as to have, on its outer face and for its entire length, projections 22 of a shape conjugate with the cells 23 to be formed in the honeycombs so that the said projections 22 extend over the entire length of the belt 21 without a break and without any difference over its entire travel so that, after the supply of wax has been received from the supply vessel 24, a continuous mass of wax 25 is transported, held between the cell projections 22 of the belt 21 and the facing run of the upper belt 26, giving rise, at the output, to a continuous element 27 of indefinite length, the structure of which corresponds basically to that of the half honeycombs to be produced. In order to separate the individual half honeycombs from the linear element 27 as a whole, the machine has a cutting device 28 for cutting the element 21 into sections of the desired length. The said cutting device may be of any suitable type, there being shown schematically, purely by way of example, a cranked blade which is operated by an eccentric or the like and which may be graduated in order to vary the length of the sections cut. As will be appreciated from FIG. 11, after the cutting operation, a section 29, constituted by a half honeycomb which will subsequently be joined back-to-back with another similar section to form a complete honeycomb, is obtained.

As will be understood, the conversion of the intermittent production system to a continuous production system will considerably improve productivity, reducing production costs.

What is claimed is:

1. A method for the production of a single honeycomb for beekeeping including half honeycombs, comprising the steps of: applying liquid wax to a mold formed by a plurality of projections directly mounted to and protruding from a first endless belt, adjacent projections being separated from one another at their point of attachment to the first endless belt so as to define spaces therebetween in which the liquid wax is received, the projections being deflected independently of each other as the first endless belt travels around a roller, the mold being made of a flexible material displaceable upon the application of a force and the projections being shaped so as to conjugate with cells of the half honeycomb in a manner such that the filling of spaces of the mold with the applied liquid wax is complimented by forming an upper plate interconnecting the cells by a second endless belt arranged parallel to the first endless belt and moving in the same direction, cooling the applied liquid wax to enable the half honeycomb to be removed from the mold by virtue of the resilience of the projections of the mold.

2. A method according to claim 1, prior to applying the liquid wax, further comprising adding to the liquid wax a small proportion of water which is replaced periodically as it is used up.

3. A method according to claim 1, after cooling the applied liquid wax, further comprising locally heating the upper plate of the half honeycomb to promote its separation from the second endless belt.

4. A method according to claim 1, further comprising coupling of two half honeycombs arranged back-to-back with the cells extending in opposite directions.

5. A method according to claim 1, further comprising producing the half honeycomb as a continuous strip.

6. A method according to claim 5, further comprising cutting said strip at preselected intervals.

7. A method for the production of a half honeycomb for beekeeping, comprising the steps of: applying a liquid wax to mold made of a flexible material displaceable upon the application of a force and formed by a plurality of projections directly mounted to and protruding from a first endless belt, adjacent projections being separate from one another at their point of attachment to the first endless belt so as to define spaces therebetween in which the liquid wax is received, the projections being deflected independently of each other as the first endless belt travels around a roller, the projections being shaped so as to conjugate with cells of the half honeycomb; providing an upper plate interconnecting the cells; and forming the upper plate, resilience of the projections of the mold enabling the half honeycomb to be removed from the mold.

8. A method according to claim 7, wherein the upper plate is formed by a second endless belt arranged parallel to a first endless belt having a plurality of projections.

* * * * *